Aug. 21, 1934.  G. E. NERNEY  1,971,229
EYEGLASS CONSTRUCTION
Filed May 13, 1932
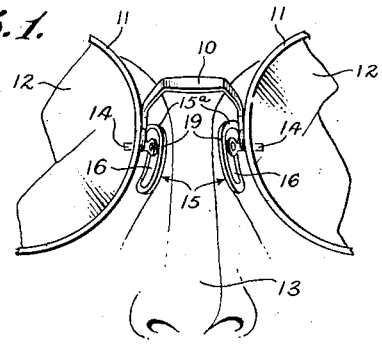
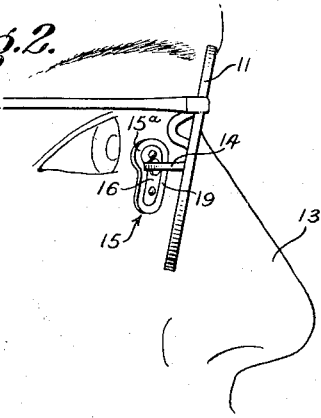
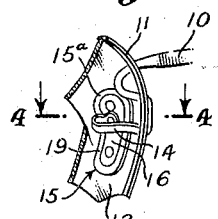
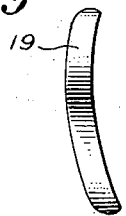
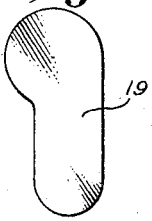
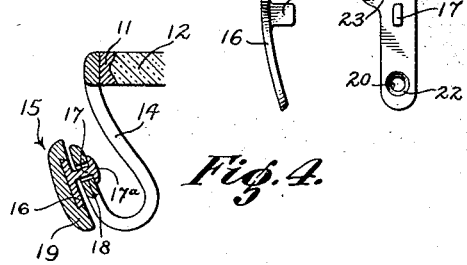
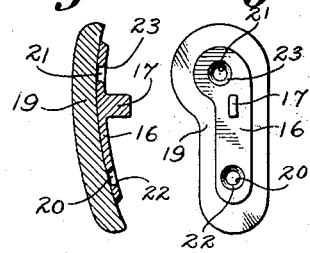
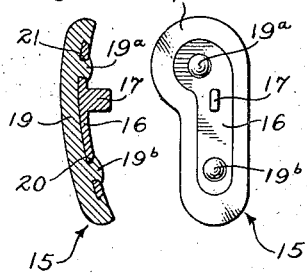
INVENTOR
George E. Nerney
BY
ATTORNEYS Patented Aug. 21, 1934

1,971,229

UNITED STATES PATENT OFFICE 1,971,229

EYEGLASS CONSTRUCTION

George E. Nerney, Attleboro, Mass., assignor to Bay State Optical Company, Attleboro, Mass., a corporation of Maine Application May 13, 1932, Serial No. 611,029

2 Claims. (Cl. 88—49)

This invention relates to an eyeglass construction and more particularly to the construction of a nose-guard.

One of the objects of this invention is to provide a nose-guard which will be simple, practical and thoroughly durable. Another object is to provide a device of the above character which may be easily and economically manufactured. Another object is to provide a device of the above character which will be pleasing in appearance and reliable in operation. Another object is to provide a device of the above character whose pressure against the nose of the wearer will be so proportioned as to most readily suit the supporting requirements of an eyeglass frame. Another object is to provide a device of the above character wherein irritability and discomfort to the wearer are successfully eliminated. Other objects will be in part obvious and in part pointed out hereinafter.

The invention accordingly consists in the features of construction, combinations of elements, arrangements of parts and in the several steps and relation and order of each of the same to one or more of the others, all as will be illustratively described herein and the scope of the application of which will be indicated in the following claims.

In the accompanying drawing, in which is shown one of the various possible embodiments of this invention, Figure 1 is a fragmentary front elevation of a portion of an eyeglass frame resting upon the nose of a wearer;

Figure 2 is a fragmentary side elevation of a portion of an eyeglass frame in position upon the wearer;

Figure 3 is a fragmentary perspective view of the bridge portion of an eyeglass frame with a nose-guard attached thereto;

Figure 4 is a sectional view taken along the line 4—4 of Figure 3;

Figure 5 is a side elevation of one of the parts from which my nose-guard is formed;

Figure 6 is a front elevation of the part shown in Figure 5;

Figure 7 is a side elevation of another of the parts from which my nose-guard is formed;

Figure 8 is a front elevation of the part shown in Figure 7;

Figure 9 is a vertical sectional view of my nose-guard during one of the intermediate steps of my process;

Figure 10 is a front elevation of the nose-guard shown in Figure 9;

Figure 11 is a vertical sectional view of my nose-guard when completed, and

Figure 12 is a front elevation of the nose-guard shown in Figure 8.

Similar reference characters refer to similar parts throughout the several views of the drawing.

As conducive to a clearer understanding of certain features of this invention, it might here be pointed out that the construction of nose-guards for eyeglass frames has presented many difficulties in the past. In practice, I have found that in order to support the central portion of an eyeglass frame properly upon the nose of the wearer, nose-guards should contact firmly with the sides of the nose. However, in the past when such a firm contact has been attempted, the nose-guards have had a tendency to dig into the sides of the nose, thereby causing irritation and discomfort to the wearer. On the other hand, when the nose-guards were so constructed as to avoid such irritation and afford comfort to the wearer, the more important supporting function of the nose-guard was often lost, this being responsible sometimes for the frame slipping down out of position upon the nose. Furthermore, although non-metallic material as, for example, zylonite, has been found more adaptable and best suited for the contacting portions of nose guards, the difficulties presented in achieving a reliable connection between such material and a metal part have been many. Where parts of the eyeglass frames used are metal, a metal connection between the guard and the frame becomes highly desirable; methods which purport to attach a metal part to a zylonite part, for example, have been found to be both labor consuming and expensive. One of the objects of this invention is to provide a device and a method in which the difficulties mentioned above, as well as many others, are successfully and practically overcome.

Referring now to the drawing in detail, there is shown in Figure 1, the bridge portion of an eyeglass frame including a bridge 10 secured to rims 11 holding lenses 12. Depending rearwardly away from the connecting points between rims 11 and bridge 10 or in a direction away from the front of nose 13, are a pair of arms 14 to which a pair of nose-guards generally indicated at 15 are loosely attached in a manner to be described hereinafter.

Arms 14 together with the parts associated therewith are substantially similar in construction so that the details thereof can be ascertained from a consideration of Figures 3 and 4, showing the parts on one side of the bridge. Secured to the rear side of nose-guard 15, in a manner to be described hereinafter, is a plate 16 so positioned and proportioned that a lug 17, which is preferably integral therewith, extends from the nose-guard at a point nearer the top thereof than the bottom, as viewed in Figure 3.

Arm 14 is substantially loop shaped, as more clearly shown in Figure 4, and lug 17 extends through a slot 18 substantially near the end of the arm. Preferably lug 17 is of greater length than the width of arm 14 (Figure 4) and formed upon the outer end thereof is an enlarged mushroom portion 17a overlapping slot 18. Accordingly, nose-guard 15 is supported by arm 14 and the connection therebetween is loose so that the nose-guard may pivot preferably in any direction, sufficient play being allowed between lug 17 and slot 18 (Figure 4) to allow for this action.

The innermost portion 19 of nose-guard 15, as most clearly shown in Figure 1, or that portion engaging nose 13, is preferably formed from some non-metallic material, an example of which is zylonite. Inasmuch as arms 14 are formed from metal, the entire connection between the nose-guards and the arms should preferably be metallic for best results. For this reason, lug 17, as well as plate 16 forming an integral part thereof, is preferably metal and I have found it highly desirable to secure plate 16 to non-metallic portion 19 in the following manner.

Although portions 19 may be formed from many non-metallic materials, I prefer to use zylonite. Portions 19 are first formed in any desired manner, for example, stamping, to assume the shape shown in Figure 5. Next, metal plates 16 are stamped preferably into the form shown in Figure 6 so that lugs 17 extend from one surface thereof. Preferably simultaneously with this stamping process, I form a pair of holes 20 and 21, countersunk as at 22 and 23 respectively, in plates 17.

Zylonite portions 19 are then heated to a temperature sufficient to allow them to become pliable, after which plates 16 are placed in position thereon, as more clearly shown in Figure 7. Plates 16 are now pressed into portions 19 so that part of the zylonite flows through holes 20 and 21 and into countersunk portions 22 and 23 thereof. After cooling, to return the zylonite to its normal self-sustaining condition, as is best shown in Figure 8, portions 19a and 19b thereof fill countersunk portions 22 and 23 to form enlarged mushroom portions holding the plate 16 firmly in its allotted position. Accordingly, plate 16 and zylonite portion 19 now form a unit so that lug 17 may support the nose-guard upon arm 14 as shown in Figure 3.

Referring to Figures 2 and 3, the upper portion 15a of nose-guard 15, as viewed in these figures, is so shaped as to have a larger nose-contacting surface than the lower portion thereof. Preferably portion 15a is round in form and a circumferential line passing about the periphery thereof and across the nose-guard preferably passes through lug 17. When the eyeglass frame shown in Figure 1 is in position upon the nose, I have found that portion 15a of nose-guard 15 rests against the most abrupt side portions of the nose, whereas the lower portions thereof contact with the lower and more oblique side portions of the nose. Accordingly, if greater pressure is applied by the nose-guards substantially at the portions of the nose engaged by portion 15a (Figure 1), the nose-guards resist more reliably any downward movement over the wider and more oblique portions of nose 13.

As described above, the pivotal point formed by lugs 17 is nearer portion 15a than the bottom of nose-guard 15. Accordingly, when nose-guards 15 are in the position shown in Figure 1, the greatest pressure against the nose is applied by portion 15a thereof. Even though this pressure is applied at these points on the nose, the total nose-contacting area where this pressure is applied, namely, the area of portion 15a, is proportionately greater. Accordingly, this greater pressure is spread out over a greater surface so that no particular point on either side of the nose bears the brunt of this additional pressure. Thus, nose-guards 15, while applying sufficient pressure to the sides of the nose at points best suited to support the eyeglass frame, nevertheless, spread this pressure over a large enough area to avoid irritation and discomfort to the wearer.

Not only are nose-guards 15 so constructed as to perform their supporting function with greatest comfort to the wearer, but lug 17 together with its integral part 16, is firmly secured and attached to the zylonite portion 19; plate 16 also acts to reinforce portion 19 of nose-guard 15. The method of attaching plate 16 to portion 19 of the nose-guard may be practiced with a minimum amount of labor and tools to reduce the cost of manufacture of this superior and practical nose-guard to a minimum.

For purposes of clarity, the term "rearward" as used herein signifies a direction substantially toward the nose of the wearer as viewed in Figure 1. The term "downward" or an equivalent term signifies a direction toward the mouth of the wearer, as viewed in Figure 2, while the term "upward" or its equivalent signifies an opposite direction or toward the forehead of the wearer as viewed in Figure 2.

It will thus be seen that I have provided a thoroughly practical and efficient device in which the several objects hereinabove referred to, as well as many others, are successfully achieved.

As many possible embodiments may be made of the mechanical features of the above invention and as the art herein described might be varied in various parts, all without departing from the scope of the invention, it is to be understood that all matter hereinabove set forth or shown in the accompanying drawing is to be interpreted as illustrative and not in a limiting sense.

I claim:

1. As an article of manufacture, a nose pad whose length is greater than its breadth and having a fastening lug extending from one surface thereof, the position of said lug being closer to one longitudinal end of said pad than to the other, the portion of said pad located between said first-mentioned end thereof and said lug being of greater width than the portion of said pad located between said second-mentioned end thereof and said lug, the distance between said lug and one longitudinal edge of said first-mentioned portion being greater than the corresponding distance between said lug and the other longitudinal edge, said first-mentioned edge curving inwardly toward said other longitudinal edge and thence downwardly in the same general direction as said other longitudinal edge.

2. In eyeglass construction, in combination, a frame having a pair of rearwardly depending arms positioned substantially adjacent the opposite sides of the nose when the frame is worn, a pair of nose pads, a lug extending from each of said nose pads and each pivotally connected to one of said arms, said lugs being closer to the upper end of said pads than to the other end thereof, the portions of said pads located above said lugs being of greater width than the portions thereof below said lugs, said lugs being closer to the upper section of the outer longitudinal edge of said pads than to the upper section of the rearward longitudinal edge thereof, said rearward longitudinal edge curving toward said outer longitudinal edge and thence downwardly in the same general direction as said outer longitudinal edge, whereby said arms hold said pads firmly against the nose so that said upper portions thereof rest against the soft fleshy portions of the nose and the lower portions thereof rest upon the substantially bony portion of the nose.

GEORGE E. NERNEY.